2,870,018

DIATHERMAL TENDERIZING OF MEAT

Beverly E. Williams, San Mateo, Calif., assignor, by mesne assignments, to Hodges Research and Development Company, New York, N. Y., a corporation of California No Drawing. Application November 9, 1953
Serial No. 391,147

4 Claims. (Cl. 99—107)

My invention relates to improvements in methods for tenderizing meats and the like and has for one object to provide a method by which animal carcasses may be treated and tenderized after slaughtering with a minimum delay, maximum tenderization and a minimum danger of spoilage.

It is well known that meat, when hung for a proper length of time becomes more tender without deterioration of flavor.

It has been customary to cool the slaughtered carcasses for many hours, perhaps several days, and to thereafter raise the temperature of the carcass, and let it hang for a while until it becomes tender enough for use.

When an animal dies, that is, when cattle and the like are slaughtered, the body is soft and flaccid. Later, rigor mortis sets in. The muscles, the meat, the flesh become stiff and rigid. The skin or pelt no longer can be freely moved on the body and the entire carcass is a rigid, stiff mass.

After, and only after rigor mortis has subsided, can those necessary chemical and biological reactions which result in tenderizing the meat be completed.

Meat is usually tenderized by two natural, separate, simultaneously occurring phenomena, enzymatic action and bacterial or microbial action. The enzymes which accomplish enzymatic tenderization are apparently in the meat before the animal is slaughtered. They are left in the meat but they do not accomplish much in the direction of tenderization until after rigor mortis has subsided.

Bacteria also tenderize the meat. They apparently reach the meat largely from the outside after slaughtering and they also do not accomplish any effective tenderization until after rigor mortis has subsided.

Meat is tenderized by enzymatic action without deterioration in flavor but the bacterial action of tenderization tends to substantially impair the flavor of the meat.

The higher the temperature at which the meat is hung the more active proportionately is the bacterial action. As the temperature rises, bacterial action becomes more important relative to enzymatic action and since bacterial action may result in sour meat and ends in the production of meat which is inedible, it is important to hang the meat at relatively low temperatures.

At body temperature rigor mortis takes place rapidly. Raising the temperature above body temperature substantially expedites completion of rigor mortis. Reducing the temperature below body temperature delays, but does not prevent completion of rigor mortis.

When meat is chilled immediately after slaughtering, completion of rigor mortis is delayed and under ordinary chilling temperatures down to but above freezing it may take as long as several days for rigor mortis to become complete and only after rigor mortis is completed can the tenderizing resulting from enzymatic and bacterial action be effective.

I have found that if after slaughtering, the temperature of the meat mass is immediately raised even but a few degrees above natural body temperature and if the rise in temperature is generally uniform throughout, rigor mortis sets in and is completed in a very short time. Thereafter the meat can be chilled to limit bacterial action while leaving enzymatic action free to tenderize the meat.

I propose therefore that after the meat is slaughtered it be immediately heated, internally and uniformly, to a temperature of perhaps five to ten degrees above natural body temperature and held at that temperature until rigor mortis is complete. The exact amount of time required for rigor mortis to become complete will depend not only upon the temperature at which the carcass is maintained, but also in part upon such factors as the type, size and age of the animal from which the carcass was obtained. However, the time required for any particular carcass may be as low as 1–5 minutes, and will rarely be longer than 10–15 minutes.

Since by internal heating, completion of rigor mortis is greatly accelerated and may take place in only a few minutes, the time during which the meat may lose moisture is so short that it can be disregarded. But of course, when the meat is hung over an extended period of time as it must be, then the loss of moisture becomes serious and steps must be taken to prevent such loss. When the meat is cooled or chilled after completion of rigor mortis, if it is exposed to a saturated or super-saturated atmosphere, moisture loss there will not occur.

As soon as rigor mortis is complete, perhaps in a few minutes, it becomes important to rapidly lower the temperature of the carcass to avoid sour rounds, spoilage, excessive bacterial action and the like and I propose to lower the temperature by exposing the meat after completion of rigor mortis to a cold super-saturated atmosphere. Since the atmosphere is super-saturated, additional moisture from the meat cannot be accepted by the atmosphere during the cooling process as the heat from the meat is extracted by the cold atmosphere. So desiccation does not occur.

Tenderization occurs as a result, as above indicated, of both enzymatic and bacterial action and so as the temperature goes down the relative importance of enzymatic action increases and the relative importance of bacterial action decreases and the more rapid the temperature fall, the less the effect of bacterial action becomes.

It will be understood that the tenderization process takes place usually above freezing, temperature below freezing usually stops the action. A temperature far above freezing does not prevent enzymatic tenderization but permits bacterial action to be so rapid that flavor is spoiled, hence the desirability of holding the temperature at just above the freezing point of water so that enzymatic action can tenderize the meat and bacterial action will not be able to spoil it.

In order to avoid the necessity of any particular control of the atmosphere in which the meat is heated and held until rigor mortis is complete, it is highly desirable that heating be exceedingly rapid and generally uniform throughout the meat mass. This requires internal rather than external heating of the meat because external heating reaches the meat only through the outer surface and must slowly penetrate through the flesh toward the interior, a slow and inefficient process which results in substantial deterioration of the appearance and quality of, especially, the surface and exposed outer layers of the carcass.

I propose, therefore, to heat the meat by induction heating or by dielectric means. Since meat includes liquid, a conductor, and fibrous material, a non-conductor, it can rightly be said that the heating of the meat by electric means partakes somewhat of dielectric heating and somewhat of induction heating and I propose to use the term diathermy borrowed from the medical profession to describe the particular kind of electric heating to which I refer. This type of internal heating results in exceedingly rapid, uniform heating of the meat, and is generally independent of the character and condition of the surface of the meat.

Any of the conventional high frequency heating equipment and methods used to produce heat in the tissues of humans can be employed in my process. In general, the high frequency currents employed for medical purposes have frequencies ranging from 1 to 50 million cycles per second. A diathermy apparatus comprising essentially a spark gap oscillator, designed to facilitate application to the material to be treated, may be used. However, the newer short wave diathermy apparatus, utilizing vacuum tube oscillators and insulated plate electrodes is preferable, as is the inductotherm, which includes a high frequency generator, and in which application of the high frequency energy is made by means of a coil which is wound around the part to be treated, or applied in pancake form over the part.

By the method thus proposed I am able to rapidly heat the meat mass without reference to the condition of its surface and without reference to the atmosphere surrounding it to a temperature such that completion of rigor mortis will be greatly expedited, so that tenderization may start at a very early stage in the meat treating process.

Thereafter by cooling and holding the meat in an atmosphere of not less than one hundred percent relative humidity the meat can be hung for the desired length of time without loss of moisture and thus without loss of weight and impairment of quality of the meat. The hanging time is a matter for decision by the individual packer. Within limits the longer the meat hangs the more tender it is and the packer balances between minimum tenderization and the desired rate of turn over or shipment of his product. Suffice it to say that my method of treating meat lends itself equally well to the packer who wants to hang his meat for the minimum length of time and the packer who wants to hang his meat as long as possible.

My method not only saves time for the packer but also results in an improved and better merchantable product. Light colored meat is preferred in the market to dark colored meat. The meat of the carcass before rigor mortis is complete is usually dark. When rigor mortis is complete the meat tends to be lighter, perhaps because of the lactic acid present.

Because I propose to insure completion of rigor mortis before any chilling whatever, I start the chilling with light colored meat and experience shows that starting with light colored meat after rigor mortis is complete, the subsequent chilling and hanging does not substantially darken the meat.

The packer, during the hanging stage, will of course maintain the carcass at a temperature above freezing because below freezing no improvement in meat quality takes place. The higher the temperature above freezing the more rapid will be tenderization but also the more important will be the relative effect of bacterial or microbial action which interferes with the character of the meat. If the packer desires to produce premium meat for which he can get a premium price he will normally hold the temperature down so that enzymatic action is the more important factor. On the other hand, if he wants a quick turn over he will raise the temperature of the meat, thus getting quicker tenderization but because the relative importance of bacterial action is greater, he will have a less desirable product. But in either case because hanging started after the very short time needed for complete rigor mortis and because hanging starts with light colored meat, no matter what product he is after, the packer will get, by using my method, a better type of meat in a shorter length of time.

I have suggested a five to ten degree rise in temperature above natural animal body temperature. At animal body temperature rigor mortis will set in and go on to completion but that is likely to be too slow a process. Any rise in temperature above animal body temperature speeds up the completion of the rigor mortis process substantially. A few degrees will help. It is not necessary to raise the temperature to a cooking temperature and experience seems to indicate that five to ten degrees above natural animal body temperature is perhaps preferable.

When the meat is heated so that rigor mortis is complete in a few minutes instead of forty-eight hours as it is when the meat is chilled, the packer can start effective hanging forty-eight hours earlier or if he wants to use the same time cycle he can let the meat hang forty-eight hours longer. Thus he can get as he pleases, a quicker turn over or a better product by the use of my method.

By completion of rigor mortis, I mean the situation where the chemical or biological changes immediately following death have time to come to their completion. A freshly killed carcass is soft and flabby. The hide may be pushed around on the carcass just the way the skin on a live animal may be. After rigor mortis is complete, the hide is rigidly attached and cannot be moved on the carcass.

Subsequently the carcass softens up and again the hide is loose and the carcass can be bent and moved around and this subsequent change following rigidity marks the end or completion of the rigor mortis phenomena. This phenomenon is ordinarily not apparent because after the carcass is firm, it is chilled and the chilling also congeals certain elements of the meat. However, if the carcass were not chilled after or during final stiffening by rigor mortis, the phenomena would be apparent.

Only after such completion of rigor mortis followed of course by "hanging" or storage can this softening and tenderization effect occur. Rigor mortis is nature's way of preparing the meat for softening or tenderization either by bacterial or by enzymatic action and the packer controls the temperature so as to promote during the softening or tenderization, enzymatic rather than bacterial tenderization.

In the trade it is understood that the meat or carcass stiffens up as a result of rigor mortis but firms up as a result of chilling. The apparent physical conditions are much the same in either case. The chemical reasons are quite different.

Although any type of meat suitable for human consumption, such as pork, lamb, mutton and the like, can advantageously be treated by the process herein disclosed, it has been found that the skinned carcasses of beef and veal are particularly improved when treated by said process.

*Example*

A steer was killed and skinned, and the carcass divided into two sides. After the customary washing, it was found that the internal temperature was 99° F. One side was subjected to high frequency heating by being placed within the active field of an inductotherm. The apparatus was set to raise and maintain the internal temperature of the carcass at 105° F. By periodically manipulating the carcass it was found that rigor mortis had progressed to a sufficient degree for the purposes of my invention after approximately 3.5 minutes of treatment. The carcass was then transferred to a chilling room wherein it was chilled to, and held at, a temperature just above freezing.

The other side was placed in the chilling room without being subjected to the high frequency heating step. Rigor mortis to the same degree as the treated sample was not completed until about 40–44 hours after slaughter.

Fresh cuts from the two sides were made and examined at intervals thereafter. It was found that the carcass that had been heated attained a given degree of tenderization several days before the carcass that had not been so heated, and had an improved color—namely the meat tissue was a lighter red.

I claim as my invention:

1. The method of accelerating the completion of rigor mortis in freshly slaughtered beef which comprises the steps of internally heating said beef diathermally to about 105° F. and diathermally maintaining said internal temperature in said beef for approximately three and one-half minutes.

2. The method of accelerating the completion of rigor mortis in freshly slaughtered animal carcasses which comprises the steps of internally heating said animal carcasses diathermally to about 105° F. and diathermally maintaining said internal temperature in said animal carcasses for approximately three and one-half minutes.

3. The method of accelerating tenderization of meat which includes the steps of internally warming the freshly slaughtered meat by inducton heating to a temperature from 5 to 10° F. above the normal temperature of the living animal and maintaining said internal temperature in said meat by induction heating thereof for from about one to about fifteen minutes without any particular control of the atmosphere, prior to cooling and refrigerating said meat.

4. The method of tenderizing meat which comprises the process of claim 3, followed by cooling said meat to refrigeration temperature in an atmosphere approximating 100% relative humidity, and then refrigerating said meat until tender.

References Cited in the file of this patent

UNITED STATES PATENTS

| 2,387,221 | Williams et al. | Oct. 16, 1945 |
| 2,519,931 | Roschen et al. | Aug. 22, 1950 |

FOREIGN PATENTS

| 465,422 | Canada | May 23, 1950 |